United States Patent
Hamilton

(10) Patent No.: US 6,910,980 B2
(45) Date of Patent: Jun. 28, 2005

(54) CUSHION RING SPROCKET ASSEMBLY AND METHOD

(75) Inventor: Jeffrey R. Hamilton, Davisburg, MI (US)

(73) Assignee: Cloyes Gear and Products, Inc., Mentor, OH (US)

( * ) Notice: Subject to any disclaimer, the term of this patent is extended or adjusted under 35 U.S.C. 154(b) by 97 days.

(21) Appl. No.: 10/391,268

(22) Filed: Mar. 18, 2003

(65) Prior Publication Data

US 2003/0176251 A1 Sep. 18, 2003

Related U.S. Application Data

(60) Provisional application No. 60/365,503, filed on Mar. 18, 2002.

(51) Int. Cl.[7] .......................... F16H 55/17; F16H 55/06
(52) U.S. Cl. .......................... 474/161; 474/156; 474/94
(58) Field of Search ................................ 474/151–156, 474/161–164, 100, 94; 74/443

(56) References Cited

U.S. PATENT DOCUMENTS

| | | | | |
|---|---|---|---|---|
| 2,953,930 A | * | 9/1960 | Meyer | 474/161 |
| 3,057,219 A | * | 10/1962 | Montgomery | 474/161 |
| 4,227,422 A | * | 10/1980 | Kawashima et al. | 474/156 |
| 4,261,214 A | * | 4/1981 | Watanabe et al. | 474/156 |
| 4,348,199 A | * | 9/1982 | Oonuma et al. | 474/156 |
| 4,756,488 A | * | 7/1988 | Cooke | 242/608.5 |
| 5,224,903 A | * | 7/1993 | Langhof et al. | 474/152 |
| 5,360,378 A | * | 11/1994 | Suzuki et al. | 474/161 |
| 6,371,874 B1 | | 4/2002 | Inoue | |

FOREIGN PATENT DOCUMENTS

| | | | | |
|---|---|---|---|---|
| DE | 100 25 736 A1 | 12/2000 | | |
| DE | 199 61 046 A1 | 6/2001 | | |
| GB | 2086817 A | * | 5/1982 | B62D/55/08 |
| JP | (57-186654) A | * | 11/1982 | 474/152 |
| JP | (57-190160) A | * | 11/1982 | 474/94 |
| WO | WO (03/095867) A1 | * | 11/2003 | F16H/7/06 |

* cited by examiner

Primary Examiner—Marcus Charles
(74) Attorney, Agent, or Firm—Fay, Sharpe, Fagan, Minnich & McKee, LLP

(57) ABSTRACT

A method for installing a cushion ring on a sprocket body to construct a sprocket assembly includes applying a deforming force to a cushion ring so that an opening therein is deformed to a shape that accommodate passage of a non-circular flange of a sprocket body therethrough. When the cushion ring is deformed, the non-circular flange of the sprocket body is inserted through the opening of the cushion ring. The deforming force is then released from the cushion ring so that the cushion ring is trapped between the flange and another portion of the sprocket body. The sprocket assembly includes at least one and typically two cushion rings trapped by respective non-circular flanges.

16 Claims, 5 Drawing Sheets

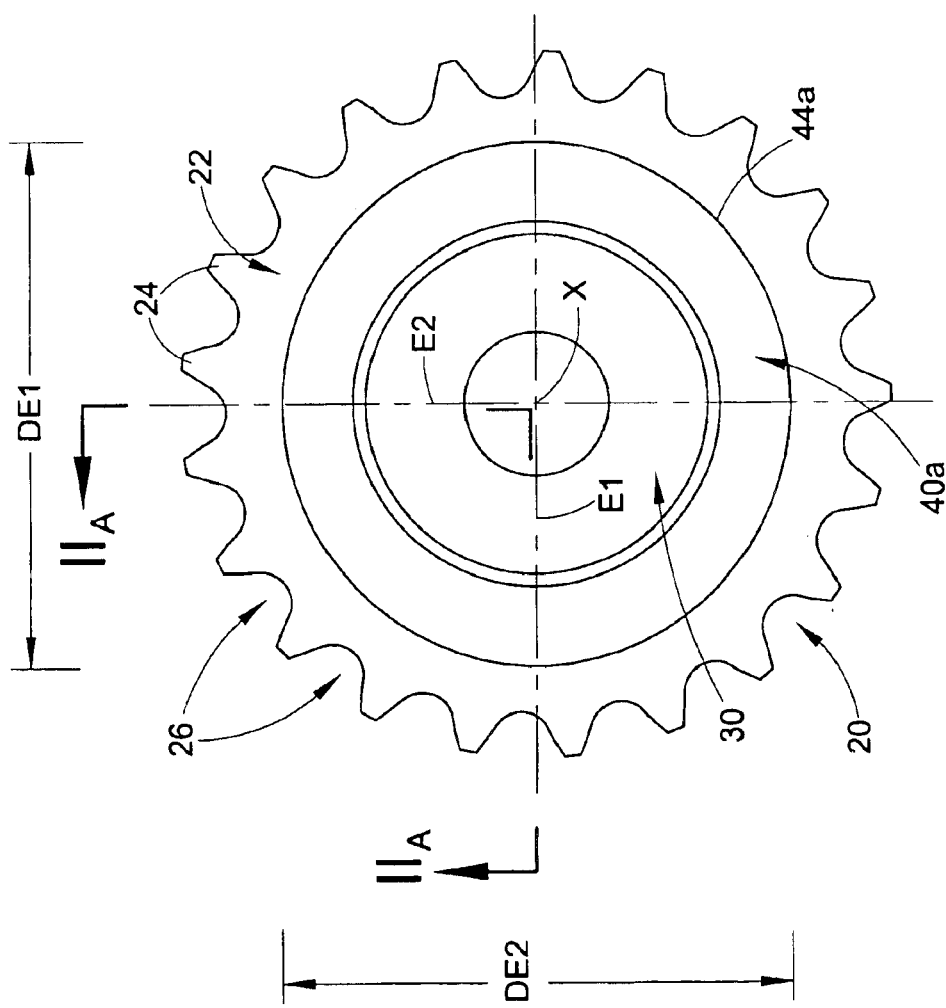
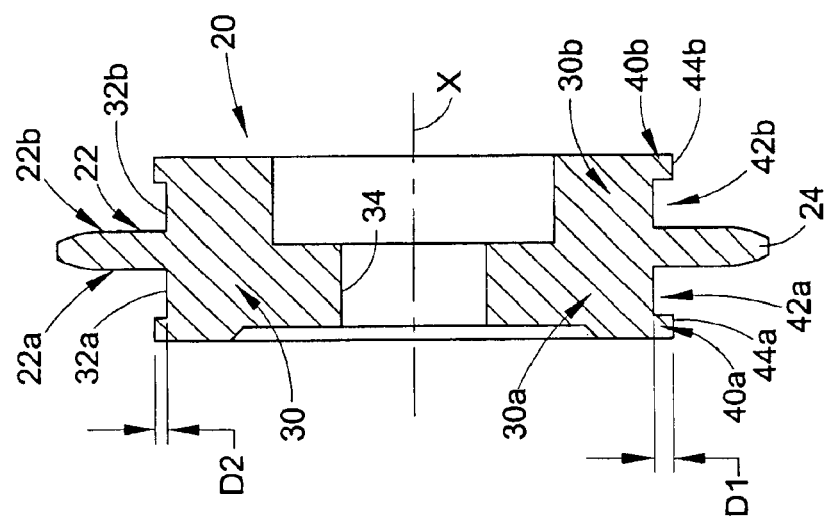
FIG. 2
FIG. 2A

CUSHION RING SPROCKET ASSEMBLY AND METHOD

CROSS-REFERENCE TO RELATED APPLICATION

This applications claims benefit of the filing date of and hereby expressly incorporates by reference U.S. provisional application Ser. No. 60/365,503 filed Mar. 18, 2002.

BACKGROUND OF THE INVENTION

FIGS. 1A–1C illustrate a conventional cushion ring sprocket S as is well known by those of ordinary skill in the art. The sprocket S comprises an annular member or portion M comprising a plurality of circumferentially spaced-apart teeth T projecting radially outward therefrom. The teeth T are separated by tooth spaces TS. The teeth T engage an associated chain (not shown). The sprocket S finds particular application in automotive engine timing and/or balance systems.

The sprocket S further comprises a hub H connected to or defined as a one-piece construction with the annular toothed portion M. First and second portions H1,H2 of the hub H project axially outwardly from the opposite first and second axial faces F1,F2 of the annular portion M (see FIGS. 1B and 1C). The first and second hub portions H1,H2 include or define respective cylindrical outer diameters OD1,OD2. As noted, the hub H and annular portion M can be assembled from separate structures or can be defined as a one-piece construction. The annular toothed portion M and hub H together define a sprocket body B that rotates about an axis of rotation X. A recess or through-bore C is defined in the hub about the axis of rotation X. The recess or bore C receives a shaft or other member that rotates with or rotatably supports the sprocket body B. The sprocket body B is typically defined from a suitable metal by casting, machining, powdered metal forming techniques or any other suitable means or material.

First and second circular cushion rings R1,R2 are provided and are loosely received on the respective cylindrical outer diameters OD1,OD2 of hub portions H1,H2, i.e., the cushion rings R1,R2 define inner diameters ID1,ID2 that are larger than the outer diameters OD1,OD2 on which the rings are received so that the rings R1,R2 can eccentrically float on the outer diameters OD1,OD2.

The cushion rings R1,R2 are movably captured or trapped on the hub portions H1,H2 by radially enlarged flanges G1,G2 that are fastened, welded or otherwise connected to the hub portions H1,H2, respectively. The flanges G1,G2 define respective circular outer diameters OG1,OG2 that are larger than the cushion ring inner diameters ID1,ID2 so as to trap the cushion rings loosely between the faces F1,F2 and flanges G1,G2, respectively.

The cushion rings R1,R2 are typically made from metal and, in use, are contacted by chain links of an associated chain (not shown) engaged with the sprocket teeth T. In use, the cushion rings R1,R2 eccentrically float on the hub outer diameters OD1,OD2 under force of the chain links and act to buffer or soften the impact of the associated chain with the sprocket S which leads to a decrease on noise.

These conventional cushion ring sprockets have been found to be highly effective. One drawback, however, is the relatively complex and time-consuming assembly process insofar as it relates to the installation of the cushion rings R1,R2 and the connection of the flanges G1,G2 to the hub portions H1,H2. In light of the foregoing, a need has been identified for the cushion ring sprocket and installation method disclosed hereinbelow.

SUMMARY OF THE INVENTION

In accordance with the present invention, a sprocket assembly includes a sprocket body comprising a hub and an annular toothed portion connected to the hub. The toothed portion comprises opposite first and second axial faces and a plurality of circumferentially spaced-apart teeth that project radially outwardly away from the hub. The first and second flanges are connected to the hub on opposite sides of the annular toothed portion. The first and second flanges each defining a non-circular periphery. A first cushion ring is loosely received on the hub between the first flange and the first axial face of the annular toothed member. A second cushion ring is loosely received on the hub between the second flange and the second axial face of the annular toothed member.

In accordance with another aspect of the present invention, a method of constructing a cushion ring sprocket assembly comprises applying a compressive force to a first cushion ring to compress the first cushion ring so that an opening thereof is temporarily and resiliently deformed into a first non-circular opening having a major diameter and a minor diameter, wherein the major diameter of the first non-circular opening is larger than the minor diameter of the first non-circular opening. A first non-circular flange of a sprocket body is aligned with the first non-circular opening so that a major diameter of the first flange is registered with the major diameter of the first non-circular opening and a minor diameter of the first flange is registered with the minor diameter of the first non-circular opening. The major diameter of the first flange is greater than the minor diameter of the first flange. The first non-circular flange is inserted through the first non-circular opening. The compressive force is removed from the first cushion ring so that the opening of the first cushion ring resiliently resumes a shape having an inside diameter that is larger than the minor diameter of the first flange and smaller than the major diameter of the first flange.

In accordance with another aspect of the present invention, a method of installing a cushion ring on a sprocket body includes applying a deforming force to a cushion ring so that an opening therein is deformed to a shape that accommodates passage of a non-circular flange of a sprocket body therethrough. When the cushion ring is deformed, the non-circular flange of the sprocket body is inserted through the opening. The deforming force is released from the cushion ring so that the cushion ring is trapped between the flange and another portion of the sprocket body.

BRIEF DESCRIPTION OF THE DRAWINGS

The invention comprises structures and arrangements of structures and steps and arrangements of steps, preferred embodiments of which are disclosed herein with reference to the drawings wherein:

FIG. 2 is a front elevational view of a sprocket body formed in accordance with the present invention;

FIG. 2A is a sectional view taken along line $II_A$—$II_A$ of FIG. 2;

DETAILED DESCRIPTION OF PREFERRED EMBODIMENTS

Figure 1:
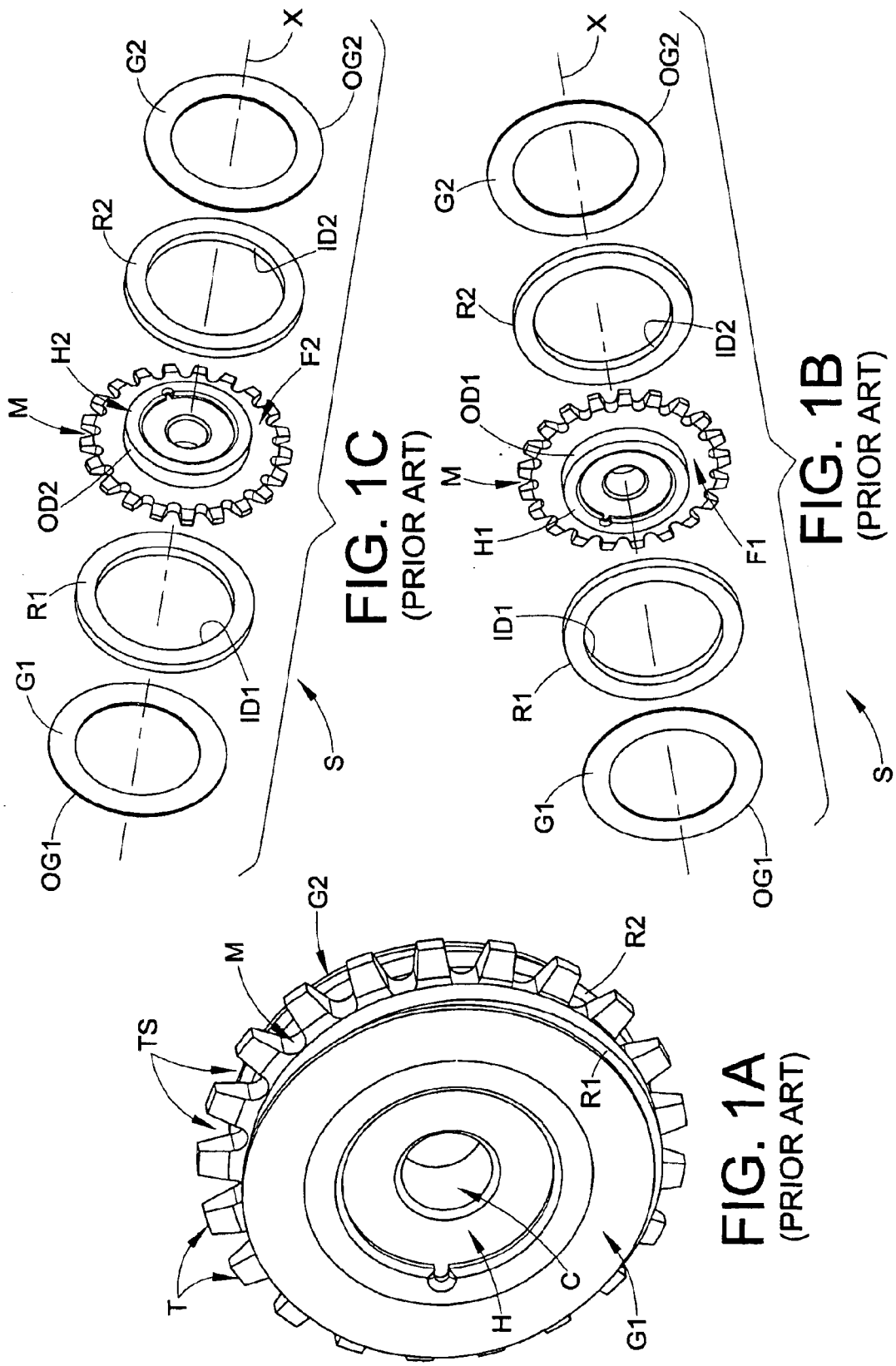
FIG. 1A (prior art) is an isometric illustrations of a conventional cushion ring sprocket.
FIGS. 1B and 1C are exploded isometric view of the sprocket shown in FIG. 1A.
Figure 6A:
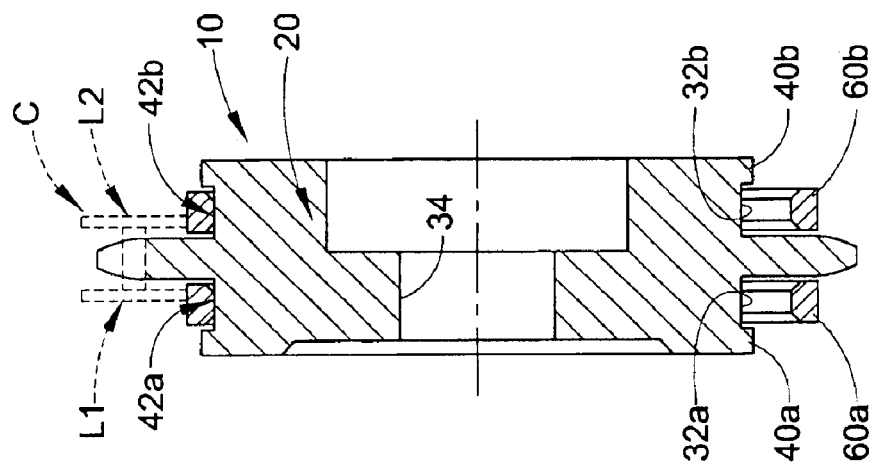
FIG. 6 corresponds to FIG. 5 but shows the cushion rings (only one visible) eccentrically arranged relative to the axis of rotation as occurs during use; and, FIG. 6A is a sectional view taken along line $VI_A$—$VI_A$ of FIG. 6.
Figure 6:
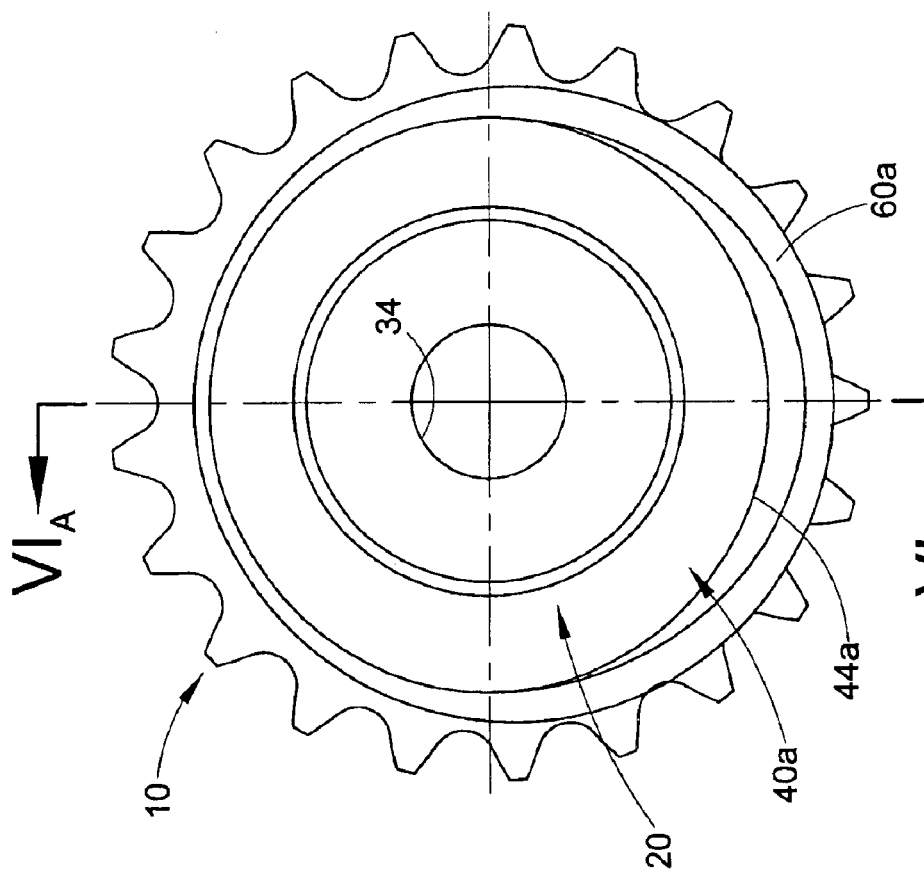

Referring briefly to FIGS. 6 and 6A, a cushion ring sprocket assembly 10 formed in accordance with the present invention comprises a sprocket body 20 and at least one cushion ring operably connected to the sprocket body 20. In the illustrated embodiment, the sprocket assembly 10 comprises two cushion rings 60a,60b operably connected thereto. In use, the sprocket assembly 10 functions substantially identically to the sprocket S described above in relation to FIGS. 1A–1C.

Referring now to FIGS. 2 and 2A, the sprocket body 20 is shown separately and comprises an annular toothed member or portion 22 comprising a plurality of circumferentially spaced-apart teeth 24 projecting radially outward therefrom. The teeth 24 are separated by tooth spaces 26.

The sprocket body 20 further comprises a hub 30 connected to or defined as a one-piece construction with the annular portion 22. As shown herein, the body 20, including the annular portion 22 and hub 30, is defined as a one-piece construction from a suitable metal material as is generally known in the art of automotive timing and balance chain drive systems. Specifically, the sprocket body 20 is defined using conventional metal forming and working techniques such as casting, forging, machining, powdered metallurgy.

The hub 30 comprises first and second hub portions 30a,30b that project axially outwardly from the opposite first and second axial faces 22a,22b of the annular portion 22. The first and second hub portions 30a,30b include or define respective cylindrical (within acceptable tolerances) outer diameter surfaces 32a,32b.

A recess or through-bore 34 is defined in the hub about an axis of rotation X. The bore 34 receives an associated shaft or other member that rotates with or rotatably supports the sprocket body 20. The outer diameter surfaces 32a,32b are concentric with the axis of rotation X.

The first and second hub portions 30a,30b comprise respective flanges 40a,40b connected thereto or formed as a one-piece construction therewith. The flanges 40a,40b are spaced from the opposite faces 22a,22b of the annular toothed portion 22 so that first and second circular grooves 42a,42b are defined. The first groove 42a is defined by the face 22a, the cylindrical surface 32a and the flange 40a. Likewise, the second groove 42b is defined by the face 22b, the cylindrical surface 32b and the flange 42b.

In accordance with the present invention, the flanges 42a,42b define respective non-circular peripheries 44a,44b so that the grooves 42a,42b vary in depth at different circumferential locations as measured from the cylindrical surfaces 32a,32b to the relevant flange periphery 44a,44b. With particular reference to FIG. 2A, the grooves 42a,42b have a first depth D1 at a first location and a second depth D2 at a second location. The flanges 44a,44b are preferably but not necessarily identical to each other, so the depths of the grooves 42a,42b can vary relative to each other.

In the illustrated preferred embodiment, the flange peripheries (peripheral edges) 44a,44b are elliptic and define a major axis E1 and a minor axis E2. The flanges thus define a major diameter DE1 at the major axis E1 and a minor diameter DE2 at the minor axis E2, wherein DE1>DE2. Regardless of the exact non-circular shape of the peripheries 44a,44b, they define first and second diameters DE1,DE2, wherein DE1>DE2. Those of ordinary skill in the art will recognize from the following disclosure that the peripheries 44a,44b need not be elliptic and can define other non-circular shapes in accordance with the present invention to satisfy the above parameters.

Figure 3:
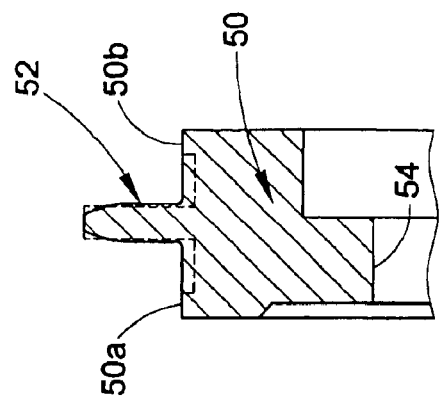
FIG. 3 is a partial sectional view of a blank from which a sprocket body according to the present invention is formed.

With brief reference to FIG. 3, in one embodiment, the sprocket body 20 is defined from a blank formed via powdered metal and/or other processing. The blank comprises a hub portion 50, an annular portion 52 projecting from the hub portion 50, and a central through-bore 54. The hub portion 50 of blank can be defined to have a desired non-circular axial ends 50a,50b that will ultimately define the flanges 40a,40b or these non-circular flanges 40a,40b can be formed by machining or the like. The blank 50 is machined or otherwise processed to remove material therefrom as indicated by the broken lines in order to define the cylindrical hub outer diameter surfaces 32a,32b, teeth 24 and tooth spaces 26. According to an alternative method, the sprocket body 20 is constructed according to the process described above in relation to FIGS. 1A–1C, wherein the non-circular flanges 40a,40b are fastened, welded or otherwise connected to the hub portions 30a,30b, respectively. The finished sprocket body 20, including the non-circular flanges 40a,40b, can also be formed directly, i.e., without first forming a blank and machining or otherwise working same, according to advanced powdered metal forming techniques, die-casting, and other methods known in the art. It is not intended that the invention be limited to any particular method of forming the sprocket body 20.

Figure 5A:
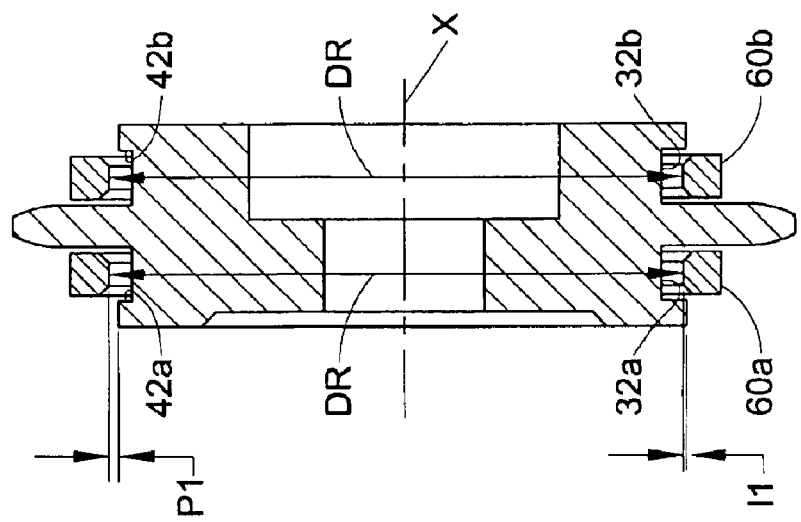
FIG. 5A is a sectional view taken along line $V_A$—$V_A$ of FIG. 5.
Figure 5:
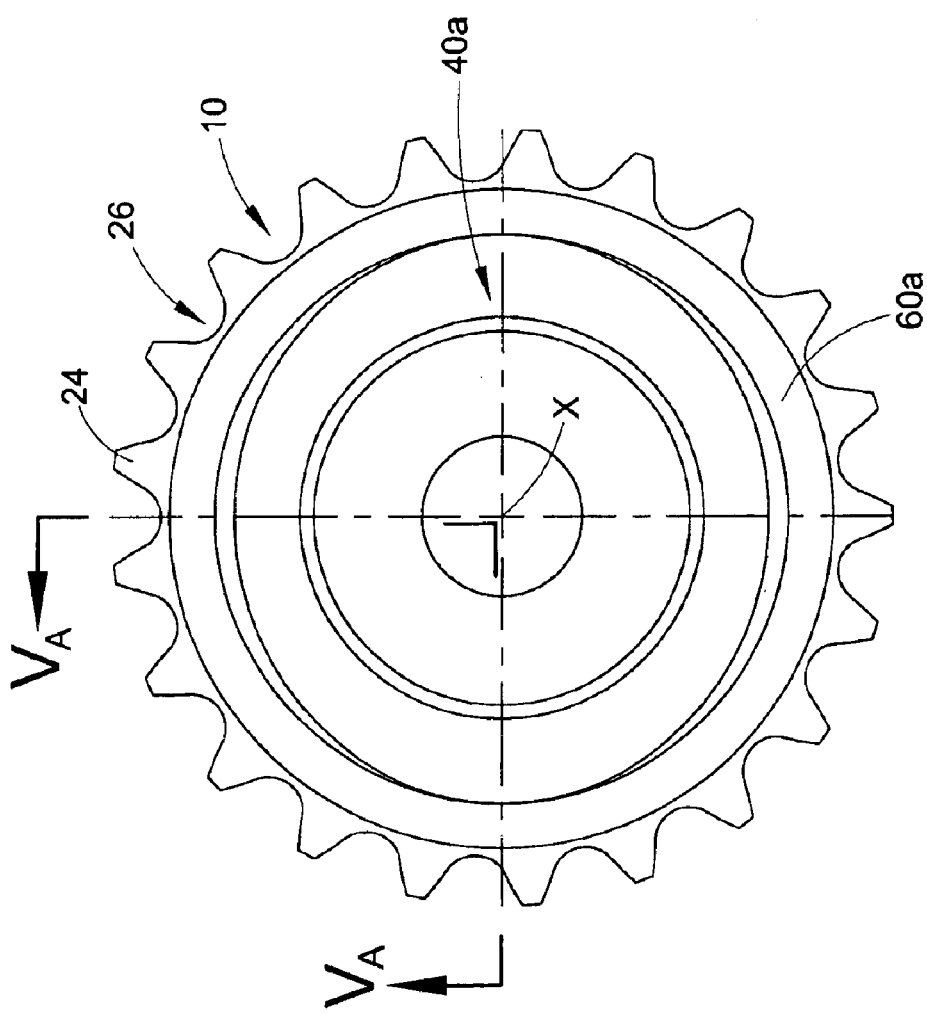
FIG. 5 is a front elevational view of a cushion ring sprocket assembly formed in accordance with the present invention (with the cushion rings (only one visible) centered relative to the axis of rotation)

FIGS. 5 and 5A show the subject sprocket assembly 10 with the first and second circular cushion rings 60a,60b centered about the axis of rotation X. The rings 60a,60b are loosely received in the respective grooves 42a,42b and float eccentrically relative to cylindrical surfaces 32a,32b. The rings 60a,60b each define a central opening having a cylindrical (with acceptable tolerances) inner diameter DR, wherein DE1>DR>DE2, i.e., the inner diameter DR of the rings 60a,60b is larger than the minor diameter DE2 of flanges 40a,40b but smaller than the major diameter DE1 of flanges 40a,40b.

As shown in FIG. 5A, when the rings 60a,60b are centered relative to axis of rotation X, a portion of the flange peripheries 44a,44b overlap the rings 60a,60b to define a radial interference I1 that prevents the rings 60a,60b from moving axially outwardly away from the annular toothed portion 22 over the respective flanges 40a,40b. In FIG. 5A, it can also be seen that a radial gap P1 is defined between the inner diameter DR of the rings 60a,60b and the flange peripheries 44a,44b in the region of the minor axis E2, but the above-noted interference I1 prevents the rings 60a,60b from escaping the grooves 42a,42b. The interference I1 is required merely to prevent the rings 60a,60b from escaping the respective grooves 42a,42b during inoperative handling of the sprocket 10. As such, the interference 11 can be very small, e.g., 0.5 millimeters (mm). As described just below, the rings 60a,60b are trapped behind the flanges 40a,40b to a much greater extent during an operative state of the sprocket 10.

Referring again to FIGS. 6 and 6A, the rings 60a,60b are shown in an operative (non-centered) position as would occur during use of the sprocket assembly 10. In particular, links L1,L2 of an associated chain C (shown in phantom) contact the rings 60a,60b and urge same into an eccentric relationship with the axis of rotation X. As such, when the sprocket assembly 10 is in use, portions of the rings 60a,60b are fully seated (and thus axially captured) in the respective grooves 42a,42b.

Figure 4:
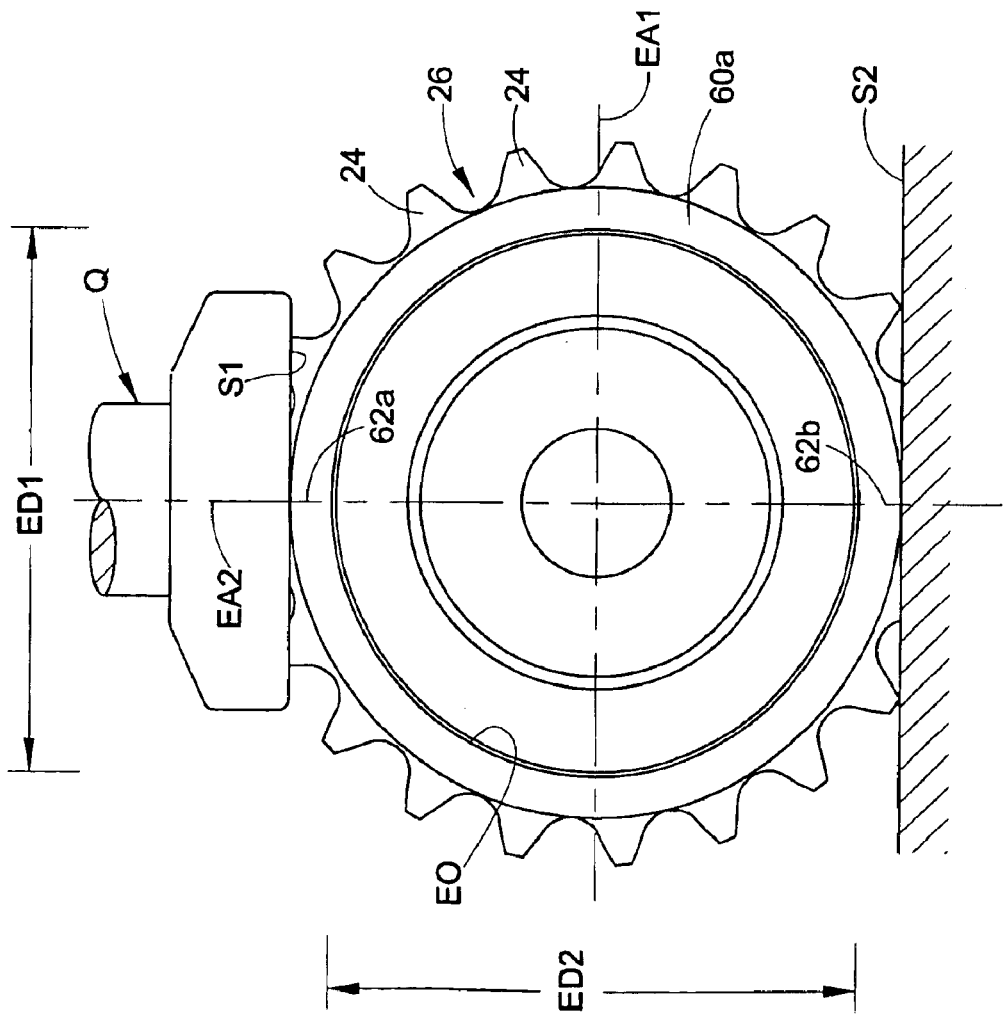
FIG. 4 is a diagrammatic illustration of a method for installing a cushion ring on a sprocket body according to the present invention.

Installation of the rings 60a,60b is disclosed with reference to FIG. 4. In particular, a tool Q comprises first and second surfaces S1,S2 between which a circular cushion ring 60a is positioned (only the ring 60a is shown in FIG. 4 but the installation procedure for the ring 60b corresponds to the procedure for the ring 60a). The tool Q includes mechanical, hydraulic, and/or electrical means for moving the first and second surfaces S1,S2 toward each other so that diametrically opposed portions 62a,62b of ring 60a are compressed toward each other a sufficient distance so that the ring temporarily resiliently elastically deforms so as to define a non-circular opening EO (the opening EO is elliptic in the illustrated preferred embodiment) with a major axis EA1 and a minor axis EA2, wherein a major diameter ED1 is defined at the major axis EA1, a minor diameter ED2 is defined at the minor axis EA2, and wherein ED1>ED2. Furthermore, the ring 60a is dimensioned so that when compressed by the tool Q as described, elliptical opening EO receives the flange 40a therethrough (when the flange 40a is properly registered or aligned) for installation of the ring 60a in the groove 42a. When the surfaces S1,S2 of the tool Q are moved apart, the ring 60a resiliently resumes its relaxed shape with a circular (within acceptable tolerances) inside diameter DR as described above. As such, once the ring 60a resumes its free circular shape, it is trapped or captured between the flange 40a and the annular toothed member 22. The rings 60a,60b can be uninstalled by reversing the above procedure.

The cushion rings 60a,60b are typically made from metal such as a suitable steel generally known in the art of automotive chain drive systems for engine timing and balance applications. In one embodiment, the rings are defined from SAE A52100 steel. The exact material used must be selected, in combination with the dimensions of the rings 60a,60b, so that the rings 60a,60b can be sufficiently elastically compressed to define a suitable non-circular opening EO without permanent deformation while also allowing the cushion ring 60a,60b to resiliently return to its natural circular shape when the compressing force subsides.

The amount by which the rings 60a,60b can be compressed without permanent deformation so that they resiliently resume their circular shape when the compressing force subsides will vary depending upon the particular material from which the rings 60a,60b are manufactured and the particular dimensions of the rings. In general, the rings 60a,60b must be able to be deformed sufficient for installation of the rings 60a,60b over the non-circular flanges 40a,40b without permanent deformation of the rings 60a, 60b, i.e., the rings must not be compressed beyond their elastic limit or yield point, which will vary according to materials and dimensions thereof which can be easily determined by those of ordinary skill in the art mathematically according to a stress-strain diagram and/or empirically as desired. Of course, it is desirable to compress the rings 60a,60b the minimum amount sufficient to allow the ring to be received over the corresponding non-circular flange 40a, 40b. In one embodiment, the rings 60a,60b are defined from SAE A52100 steel to have an outside diameter of 41.9862 millimeters (mm), an inside diameter of 39.9542 mm and a thickness (the difference between the outside and inside diameters) of 2.032 mm when uncompressed (free). These rings 60a,60b can be compressed at least to an elliptical shape having a major outside diameter of 43.5102 mm and a minor outside diameter of 40.4622 mm for installation as described above.

The terms "circular" and "cylindrical" as used herein are intended to be construed with an allowance for acceptable tolerances as known by those of ordinary skill in the art. Furthermore, the invention has been disclosed with reference to preferred embodiments. Modifications and alterations will occur to those of ordinary skill in the art, and it is intended that the claims be construed literally and/or according to the doctrine of equivalents to encompass all such modifications and alterations.

I claim:

1. A sprocket assembly comprising:

a sprocket body comprising a hub and an annular toothed portion connected to said hub, said toothed portion comprising opposite first and second axial faces and comprising a plurality of circumferentially spaced-apart teeth that project radially outwardly away from said hub;

first and second flanges connected to said hub on opposite sides of said annular toothed portion, said first and second flanges each defining a non-circular periphery;

a first cushion ring loosely received on said hub between said first flange and said first axial face of said annular toothed member; and, a second cushion ring loosely received on said hub between said second flange and said second axial face of said annular toothed member.

2. The sprocket assembly as set forth in claim 1, wherein:

said first and second flanges each define a major diameter and a minor diameter that is smaller than said major diameter;

said first cushion ring defines an inner diameter that is larger than said minor diameter of said first flange and smaller than said major diameter of said first flange; and, said second cushion ring defines an inner diameter that is larger than said minor diameter of said second flange and smaller than said major diameter of said second flange.

3. The sprocket assembly as set forth in claim 1, wherein:

said sprocket rotates about an axis of rotation;

a first interference is defined between a portion of said first flange that radially overlaps a portion of said first cushion ring when said first cushion ring is centered relative to said axis of rotation; and, a second interference is defined between a portion of said second flange that radially overlaps a portion of said second cushion ring when said second cushion ring is centered relative to said axis of rotation.

4. The sprocket assembly as set forth in claim 1, wherein:

said first and second cushion rings define circular inside diameters;

said first cushion ring is selectively deformable to define a first non-circular inside diameter that accommodates movement of said first flange therethrough when said first flange is registered with said first non-circular inside diameter; and, said second cushion ring is selectively deformable to define a second non-circular inside diameter that accommodates movement of said second flange therethrough when said second flange is registered with said second non-circular inside diameter.

5. The sprocket assembly as set forth in claim 1, wherein said first and second cushion rings are defined from steel.

6. The sprocket assembly as set forth in claim 1, wherein said hub and said annular toothed portion of said sprocket body are defined as a one-piece construction.

7. The sprocket assembly as set forth in claim 6, wherein said hub, said annular toothed portion and said first and second flanges of said sprocket body are defined as a one-piece construction.

8. The sprocket assembly as set forth in claim 7, wherein said sprocket body is defined from compacted powdered metal.

9. The sprocket assembly as set forth in claim 1, wherein said first and second flanges each define an elliptical periphery.

10. The sprocket assembly as set forth in claim 1, wherein said first and second cushion rings eccentrically float on said hub of said sprocket body.

11. A sprocket assembly comprising:

a sprocket body comprising a hub and an annular toothed portion connected to said hub, said toothed portion comprising opposite first and second axial faces and comprising a plurality of circumferentially spaced-apart teeth that project radially outwardly away from said hub;

a first flange connected to said hub and cooperating with said first axial face of said toothed portion to define a first groove, said first flange defining a non-circular periphery;

a first cushion ring loosely received on said hub in said first groove.

12. A method of constructing a cushion ring sprocket assembly, said method comprising:

applying a compressive force to a first cushion ring to compress said first cushion ring so that an opening thereof is temporarily and resiliently deformed into a first non-circular opening having a major diameter and a minor diameter, wherein the major diameter of the first non-circular opening is larger than the minor diameter of the first non-circular opening;

aligning a first non-circular flange of a sprocket body with said first non-circular opening so that a major diameter of said first flange is registered with said major diameter of said first non-circular opening and a minor diameter of said first flange is registered with said minor diameter of said first non-circular opening, wherein said major diameter of said first flange is greater than said minor diameter of said first flange;

inserting said first non-circular flange through said first non-circular opening;

removing said compressive force from said first cushion ring so that said opening of said first cushion ring resiliently resumes a shape having an inside diameter that is larger than said minor diameter of said first flange and smaller than said major diameter of said first flange.

13. The method as set forth in claim 12, further comprising:

applying a compressive force to a second cushion ring to compress said second cushion ring so that an opening thereof is temporarily and resiliently deformed into a second non-circular opening having a major diameter and a minor diameter, wherein the major diameter of the second non-circular opening is larger than the minor diameter of the second non-circular opening;

aligning a second non-circular flange of a sprocket body with said second non-circular opening so that a major diameter of said second flange is registered with said major diameter of said second non-circular opening and a minor diameter of said second flange is registered with said minor diameter of said second non-circular opening, wherein said major diameter of said second flange is greater than said minor diameter of said second flange;

inserting said second non-circular flange through said second non-circular opening;

removing said compressive force from said second cushion ring so that said opening of said first cushion ring resiliently resumes a shape having an inside diameter that is larger than said minor diameter of said second flange and smaller than said major diameter of said second flange.

14. The method as set forth in claim 12, wherein said first non-circular flange defines an elliptical periphery.

15. The method as set forth in claim 13, wherein said first and second flanges each define an elliptical periphery.

16. A method of installing a cushion ring on a sprocket body, said method comprising:

applying a deforming force to a cushion ring so that an opening therein is deformed to a shape that accommodates passage of a non-circular flange of a sprocket body therethrough;

when said cushion ring is deformed, inserting said non-circular flange of said sprocket body through said opening;

releasing said deforming force from said cushion ring so that said cushion ring is trapped between said flange and another portion of said sprocket body.

* * * * *